United States Patent [19]

Fee

[11] 4,387,028
[45] Jun. 7, 1983

[54] USE OF QUATERNIZED POLYALKYLENE POLYAMINES AS DEMULSIFIERS

[75] Inventor: Basil S. Fee, Sarnia, Canada

[73] Assignee: The Dow Chemical Company, Midland, Mich.

[21] Appl. No.: 326,238

[22] Filed: Dec. 1, 1981

[51] Int. Cl.³ ............................................. B01D 17/04
[52] U.S. Cl. .................................... 210/708; 210/735; 208/188
[58] Field of Search ................ 252/344; 210/736, 708, 210/735

[56] References Cited

U.S. PATENT DOCUMENTS

| | | | |
|---|---|---|---|
| 3,004,924 | 10/1961 | Kirkpatrick et al. | 252/344 |
| 3,205,169 | 9/1965 | Kirkpatrick et al. | 252/855 |
| 4,029,708 | 6/1977 | Seitz et al. | 260/584 B |
| 4,088,600 | 5/1978 | Harrington et al. | 252/344 |
| 4,089,803 | 5/1978 | Bessler | 252/344 |
| 4,308,149 | 12/1981 | Selvaratan | 210/736 |

*Primary Examiner*—Delbert E. Gantz
*Assistant Examiner*—Anthony McFarlane

[57] ABSTRACT

Emulsions of oil and water are broken by contacting the emulsions with a quaternized polyalkylene polyamine, e.g., the adduct of 2-hydroxy-3-chloropropyl trimethyl ammonium chloride and a polyethylene polyamine.

9 Claims, No Drawings

USE OF QUATERNIZED POLYALKYLENE POLYAMINES AS DEMULSIFIERS

BACKGROUND OF THE INVENTION

This invention relates to the use of quaternized polyamines in the preventing, breaking or resolving of emulsions of the water-in-oil type as well as oil-in-water type emulsions.

Most naturally occurring emulsions of petroleum oil and water take the form of water-in-oil emulsions in which the oil is a continuous phase and tiny drops of water are dispersed in the oil. Occasionally, however, oil-in-water emulsions are often encountered either in the production, handling or refining of petroleum oil or fractions thereof. Unfortunately, in both cases the emulsions are often extremely stable and will not resolve after standing for long periods. While such emulsions often occur naturally, such emulsions may also occur artificially resulting from one or more of numerous operations encountered in various industries. For example, such emulsions may be obtained from producing wells as a result of enhanced oil recovery methods or from the bottom of crude oil storage tanks. Other such oil-in-water emulsions include steam cylinder emulsions, wax-hexane-water emulsions, butadiene-tar-in-water emulsions, emulsions of flux oil and steam condensate, styrene-in-water emulsions and synthetic latex-in-water emulsions. In all instances, it is generally desirable to resolve the emulsion in order that the oil phase may be separated from the water phase.

Historically, such emulsions have been resolved or broken by contacting the emulsion with a chemical demulsifying agent thereby causing the emulsions to resolve and stratify into its component phases of water and oil or brine and oil after the emulsion has been allowed to stand in a relatively quiescent state. In another type of demulsification, the emulsion contains substantial quantities of salt in the aqueous phase and it is necessary to carry out a desalting operation prior to further refinement of the oil phase in order to prevent the accumulation of large deposits of salt in the refining apparatus. In such desalting operations, it is common to employ a chemical demulsifying agent in a manner similar hereinbefore. A wide variety of chemical demulsifying agents has been employed in this manner in the past. For example, such demulsifying agents include oxyalkylated condensation products obtained by reacting phenols, formaldehydes and alkylene polyamines as disclosed in U.S. Pat. No. 3,166,516; ultra high molecular weight ethylenically unsaturated polymers, polyalkylene oxylene polymers, polyesters, polyamides, polymer of ketenes and the like as described in U.S. Pat. No. 3,557,017; aminoamido polymers as described in U.S. Pat. No. 3,528,928; as well as other chemicals such as sulfonates, oxyalkylated amines, oxyalkylated alkylphenols, oxyalkylated alcohols and the like. While each of the foregoing and other conventional demulsifiers are effective in some emulsions, it is found that many are not as effective as desired, particularly in resolving emulsions derived from steam recovery of heavy crudes by processes typical of some of the California oil fields.

Accordingly, it is highly desirable to provide a demulsification process for resolving emulsions of such heavy crudes as well as other water-in-oil emulsions and the like.

SUMMARY OF THE INVENTION

The present invention is such a demulsification method which comprises contacting an emulsion of oil and water with a quaternized polyalkylene polyamine which is the adduct of a halohydroxyalkyl quaternary ammonium compound and a polyalkylene polyamine.

While the demulsification method of the present invention is particularly effective in resolving emulsions of water in heavy crudes as are commonly recovered from the California oil fields, such demulsification method is also effective for resolving other emulsions of oil-in-water and water-in-oil.

DETAILED DESCRIPTION OF THE ILLUSTRATIVE EMBODIMENTS

Emulsions of oil-in-water that are most effectively resolved by the method of this invention are oil field emulsions containing relatively small proportions of crude petroleum oil dispersed in water or brine and are hereinafter characterized as oil-in-water emulsions. Other such oil-in-water emulsions include emulsions in which traces of lubricating oil are found dispersed in steam from steam engines and steam pumps often called steam-cylinder emulsions; emulsions encountered in the waxing operations in oil refining, often called wax-hexane-water emulsions; emulsions of flux oil in steam condensate produced in the catalytic dehydrogenation of butylene to produce butadiene; styrene-in-water emulsions; emulsions generated by sewage disposal operations and the like. Although not as preferably resolved as the oil-in-water emulsions, water-in-oil emulsions are suitably treated by the method of this invention. Such water-in-oil emulsions are generally those naturally occurring emulsions of water and petroleum oil wherein the continuous oil phase has tiny droplets of water dispersed therein.

The preferred oil-in-water emulsions may contain widely different proportions of dispersed phase, for example, the oil field emulsions may carry crude oil in proportions varying from a few parts per million to about 40 weight percent or higher in rare cases. All of such emulsions are suitably treated in the practice of this invention, most preferably, however, such oil-in-water emulsions contain from about 0.01 to about 30 weight percent of oil based on the weight of the emulsions. Also, while the method of the present invention is effective in treating emulsions derived from light crudes, the method is most effective in treating emulsions of somewhat heavier crudes wherein the crude has a specific gravity in the range from about 0.8 to about 0.97 gram/milliliter.

The quaternized polyalkylene polyamines employed in the present invention are adducts of polyalkylene polyamines and a halohydroxyalkyl quaternary ammonium compound. Exemplary polyalkylene polyamines include ethylenediamine, diethylenetriamine, triethylenetetramine, tetraethylenepentamine, pentaethylenehexamine, hexaethyleneheptamine, 1-aminoethylpiperazyl diethylenetriamine, 1-aminoethylpiperazyl triethylenetetramine, propylenediamine, dipropylenetriamine, butylenediamine, aminoethylpropylenediamine and other polyamines having at least one primary amino group separated from another primary amino or secondary amino group by 2 to 4 carbon atoms. Of these polyalkylene polyamines, the higher molecular weight polyethylene polyamines and polypropylene amines such as those having a number average of 100 to 15,000 are preferred. Of particular interest are the polyalkylene polyamines that are cross-linked with ethylene dichloride or the like as well as mixtures of such cross-linked polyamines with other polyalkylene polyamines as mentioned hereinbefore.

Reacted with this polyalkylene polyamine is a halohydroxyalkyl quaternary ammonium salt. Examples of such quaternary ammonium salts include 2-hydroxy-3-chloropropyl trimethylammonium chloride, and similar hydroxyhaloalkyl trialkyl ammonium and other halohydroxyalkyltrialkyl ammonium halides with 2-hydroxy-3-chloropropyltrimethylammonium chloride being preferred. The adduct of the polyalkylene polyamine and quaternary ammonium salt is advantageously prepared by adding the quaternary ammonium salt to the polyalkylene polyamine at ambient temperature. The mixture is then adjusted to alkaline conditions, e.g., pH=8, by the addition of an aqueous solution of sodium hydroxide or other strong base. The resulting mixture is then heated, e.g., to 90° C. for 8 hours, until the reaction is completed. While the ratio of the quaternary salt to polyalkylene polyamine in the adduct is not particularly critical, it is generally desirable that the molar ratio of quaternary ammonium moiety to amino moiety in the polyalkylene polyamine be in the range from about 0.01:1 to about 0.8:1, preferably from about 0.05:1 to about 0.8:1.

In the practice of this invention, the emulsion to be resolved is contacted with an amount of the adduct which is effective to cause the emulsion to separate into two essentially distinct phase upon standing. Generally, such an amount will be in the range from about 1 to about 1,000 weight parts of the adduct per million weight parts (ppm) of the emulsion, preferably from about 10 to about 100 ppm.

The following examples are given to further illustrate the detailed practice of the invention and should not be construed as limiting its scope. Unless otherwise indicated, all parts and percentages are by weight.

EXAMPLE 1

To 100 grams of an oil-in-water emulsion containing about 10 weight percent of crude oil having a specific gravity of 0.8 g/ml is added about 2.4 parts per million based on the emulsion of the reaction product of 1 equivalent of N-(3-chloro-2-hydroxypropyl)trimethyl ammonium chloride and 1 equivalent of polyethylene polyamine having a number average molecular weight of 324. The emulsion is then shaken for 5 minutes to effectively disperse the adduct into the emulsion. Thereafter, the emulsion is allowed to stand for 4 hours after which time the phases separate such that each phase is essentially free of dispersed droplets of the other phase. In a similar manner, different samples of the same emulsion are contacted with different amounts of adducts within the scope of this invention and evaluated for demulsification efficiency. The results of these evaluations are recorded in Table I.

For purposes of comparison, a conventional polyalkylene polyamine demulsifier is similarly added to different samples of the aforementioned emulsion and evaluated for demulsification efficiency. The results of these evaluations are also recorded in Table I.

TABLE I

| Sample No. | Demulsifying Agent[1] | | Demulsification Efficiency[2] |
|---|---|---|---|
| | Type | Amount, ppm | |
| C$_1$* | Polyamine | 2.4 | 3 |
| C$_2$* | Polyamine | 12.2 | 3 |
| C$_3$* | Polyamine | 24.5 | 3 |
| 1 | 10% Quat | 2.4 | 4 |
| 2 | 10% Quat | 12.2 | 2 |
| 3 | 10% Quat | 24.5 | 3 |
| 4 | 25% Quat | 2.4 | 1 |
| 5 | 25% Quat | 12.2 | 1 |
| 6 | 25% Quat | 24.5 | 3 |
| 7 | 50% Quat | 2.4 | 1 |
| 8 | 50% Quat | 12.2 | 2 |
| 9 | 50% Quat | 24.5 | 3 |
| 10 | 75% Quat | 2.4 | 1 |
| 11 | 75% Quat | 12.2 | 2 |
| 12 | 75% Quat | 24.5 | 3 |

*Not an example of this invention.
[1]Polyamine - polyethylene polyamine having Mn = 50,000
10% Quat - the above polyamine wherein 10 mole percent of the secondary amino groups of the polyamine is quaternized with N—(3-chloro-2-hydroxypropyl)-trimethyl ammonium chloride
25% Quat - the above polyamine wherein the named mole percent of secondary amino groups is quaternized
50% Quat - the above polyamine wherein the named mole percent of secondary amino groups is quaternized
75% Quat - the above secondary polyamine wherein the named mole percent of amino groups is quaternized
[2]Ratings of efficiency are the following:
1 - clear aqueous phase, clean interface, good oil
2 - slightly cloudy aqueous phase, clean interface, good oil
3 - cloudy aqueous phase, clean interface, good oil
4 - slight activity, poor interface, some oil breakout As evidenced by the data in Table I, the quaternized polyalkylene polyamines employed in the practice of the present invention, particularly those containing more than 10 mole percent quaternized moiety, are very effective demulsifiers at low concentrations.

What is claimed is:

1. A demulsification method which comprises contacting an emulsion of oil and water with a demulsifying amount of a quaternized polyalkylene polyamine which is an adduct of a halohydroxyalkyl quaternary ammonium compound and a polyalkylene polyamine.

2. The method of claim 1 wherein the emulsion is an oil-in-water emulsion.

3. The method of claim 2 wherein the oil phase of the emulsion is crude oil having a density in the range from about 0.8 to about 0.97 gram/milliliter.

4. The method of claim 1 wherein the halohydroxyalkyl quaternary ammonium compound is a halohydroxyalkyl trimethyl ammonium halide.

5. The method of claim 4 wherein the quaternary ammonium compound is 2-hydroxy-3-chloropropyl trimethyl ammonium chloride.

6. The method of claim 1 wherein the polyalkylene polyamine has a number average molecular weight in the range of from about 100 to about 15,000.

7. The method of claim 6 wherein the polyalkylene polyamine is cross-linked with ethylene dichloride.

8. The method of claim 1 wherein the ratio of quaternary ammonium moiety to amine moiety in the quaternized polyalkylene polyamine is in the range from about 0.05:1 to about 0.8:1.

9. The method of claim 1 wherein said demulsifying amount is in the range from about 10 to about 100 weight parts of quaternized polyalkylene polyamine per million weight parts of the emulsion.

* * * * *